(12) United States Patent
Roys et al.

(10) Patent No.: US 8,678,049 B2
(45) Date of Patent: Mar. 25, 2014

(54) METHOD AND STRUCTURE FOR PREVENTION OF INCORRECT FUELING OPERATIONS FOR DIESEL-POWERED VEHICLES

(76) Inventors: Curtis Roys, Kingsland, TX (US); N. William Parker, Hillsboro, OR (US)

( * ) Notice: Subject to any disclaimer, the term of this patent is extended or adjusted under 35 U.S.C. 154(b) by 434 days.

(21) Appl. No.: 13/153,180

(22) Filed: Jun. 3, 2011

(65) Prior Publication Data
US 2012/0305127 A1 Dec. 6, 2012

(51) Int. Cl.
*B65B 1/30* (2006.01)
(52) U.S. Cl.
USPC .................... 141/96; 141/1; 141/350; 285/93
(58) Field of Classification Search
USPC ............................. 141/1, 94, 96, 350; 285/93
See application file for complete search history.

(56) References Cited

U.S. PATENT DOCUMENTS

| | | | |
|---|---|---|---|
| 3,911,977 A | 10/1975 | Berger | |
| 5,156,198 A * | 10/1992 | Hall | 141/94 |
| 5,249,612 A | 10/1993 | Parks et al. | |
| 5,605,182 A * | 2/1997 | Oberrecht et al. | 141/94 |
| 5,857,501 A * | 1/1999 | Kelerich et al. | 141/94 |
| 6,116,298 A * | 9/2000 | Haimovich et al. | 141/94 |
| 6,302,169 B1 | 10/2001 | Pulos | |
| 6,374,868 B1 | 4/2002 | Channing | |
| 6,607,014 B2 | 8/2003 | Webb | |
| 6,648,033 B2 | 11/2003 | Gabbey et al. | |
| 6,712,102 B2 | 3/2004 | Zerangue, Sr. | |
| 6,871,677 B2 | 3/2005 | Zerangue, Sr. | |
| 6,923,226 B2 | 8/2005 | Bartlett | |
| 7,051,772 B2 | 5/2006 | Dillon | |
| 7,464,736 B2 | 12/2008 | Jones et al. | |
| 7,621,303 B2 | 11/2009 | Buchgraber | |
| 7,644,740 B2 | 1/2010 | Benjey et al. | |
| 7,661,550 B2 | 2/2010 | Feichtinger | |
| 7,841,357 B2 * | 11/2010 | Rankin | 137/1 |
| 2008/0302442 A1 * | 12/2008 | Miceli | 141/311 R |

* cited by examiner

*Primary Examiner* — Jason K Niesz
(74) *Attorney, Agent, or Firm* — Scheinberg & Associates, PC; John B. Kelly; Michael O. Scheinberg

(57) ABSTRACT

A method and structure are described for preventing the accidental introduction of gasoline into the fuel system of a diesel-powered vehicle. In a first preferred embodiment, a gasoline fuel nozzle is configured with a magnet, such as magnetic strips, and the entrance to a fill tube of a diesel-powered is configured with a magnetic field sensor ring. When an incorrect fueling operation, such as the introduction of gasoline into the fuel tank of the diesel-powered vehicle, is attempted the sensor ring alerts the operator visually and/or audibly before fueling starts, thereby preventing incorrect fueling. In alternative embodiments, sensing of an attempted incorrect fueling operation may require only the sensor ring.

17 Claims, 13 Drawing Sheets

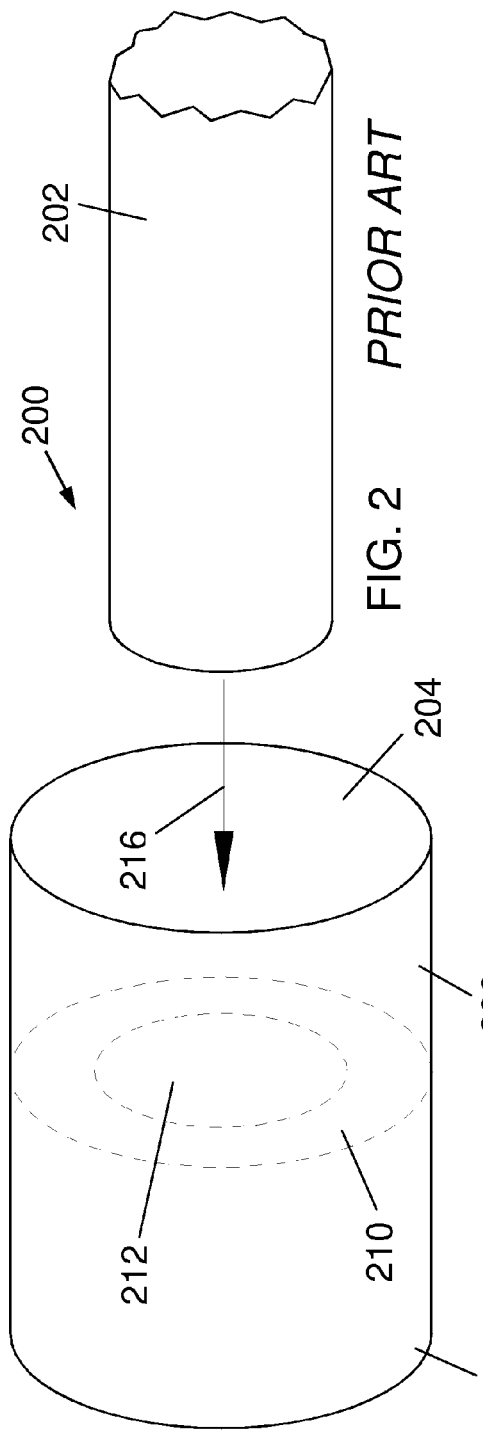
FIG. 2 *PRIOR ART*
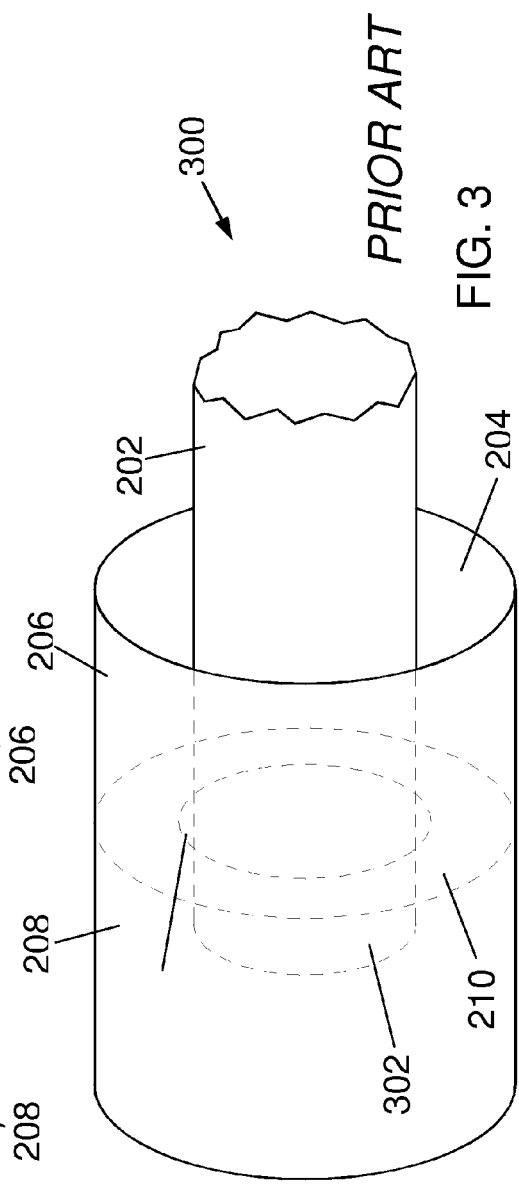
FIG. 3 *PRIOR ART*

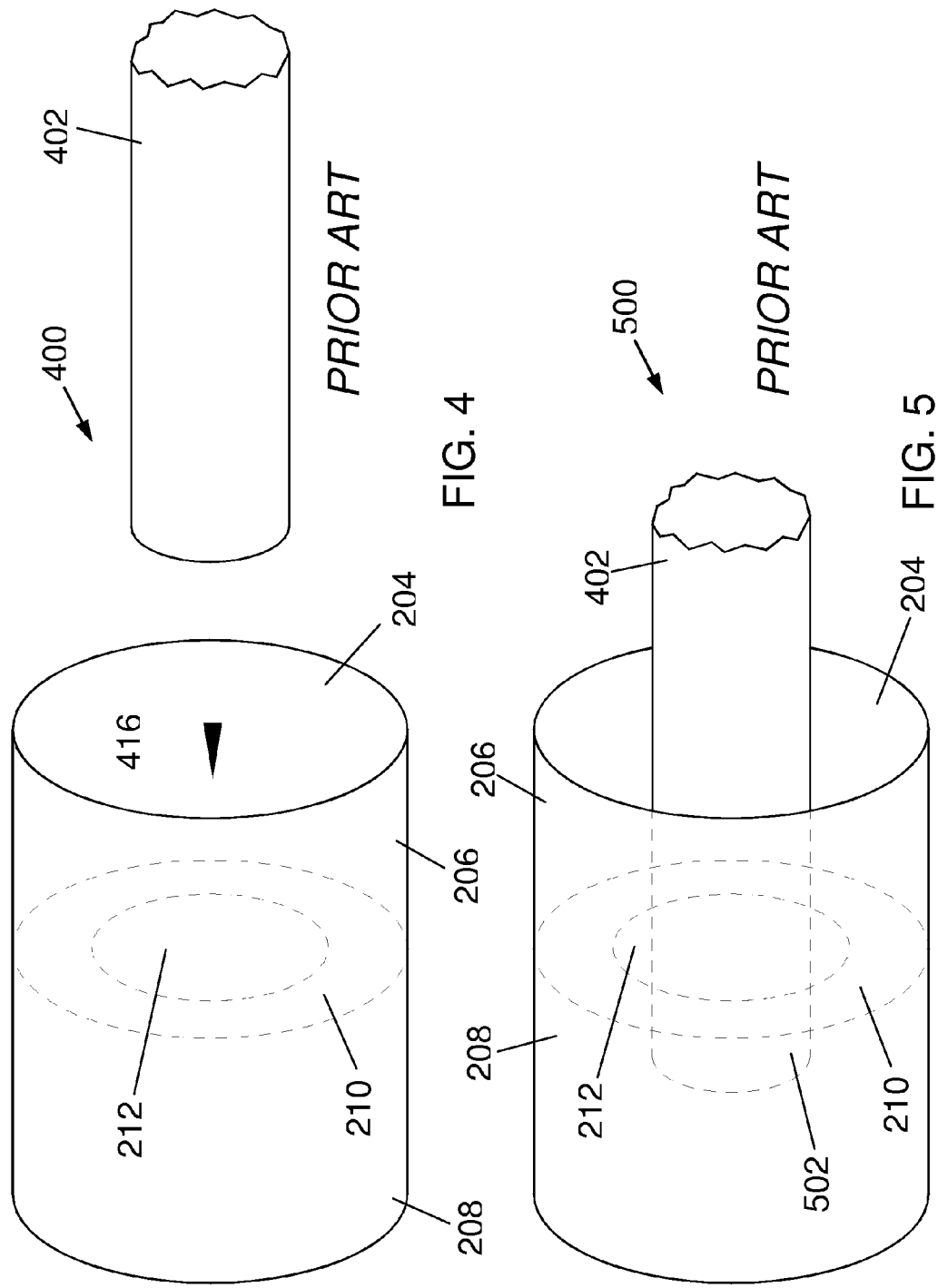

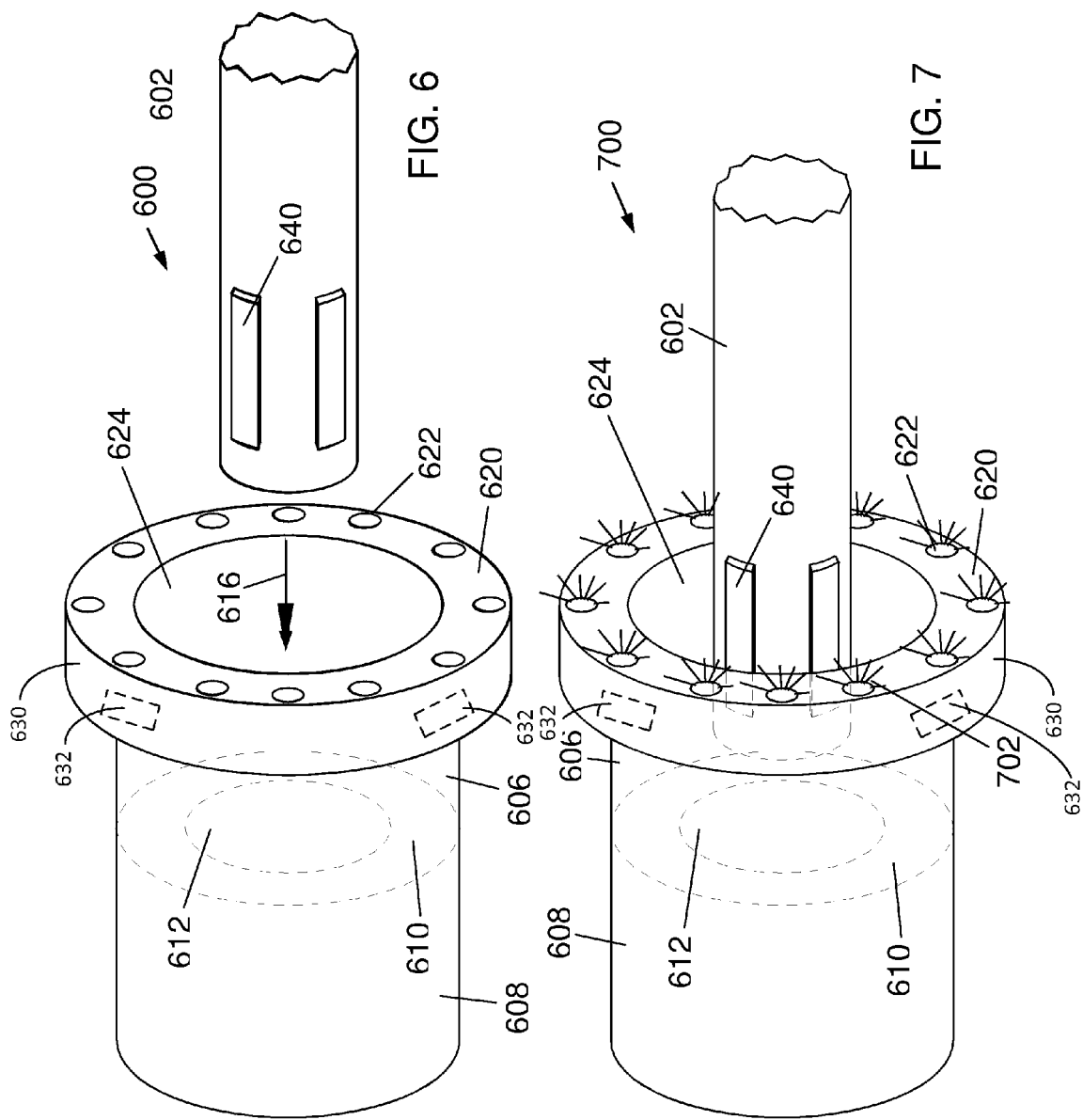

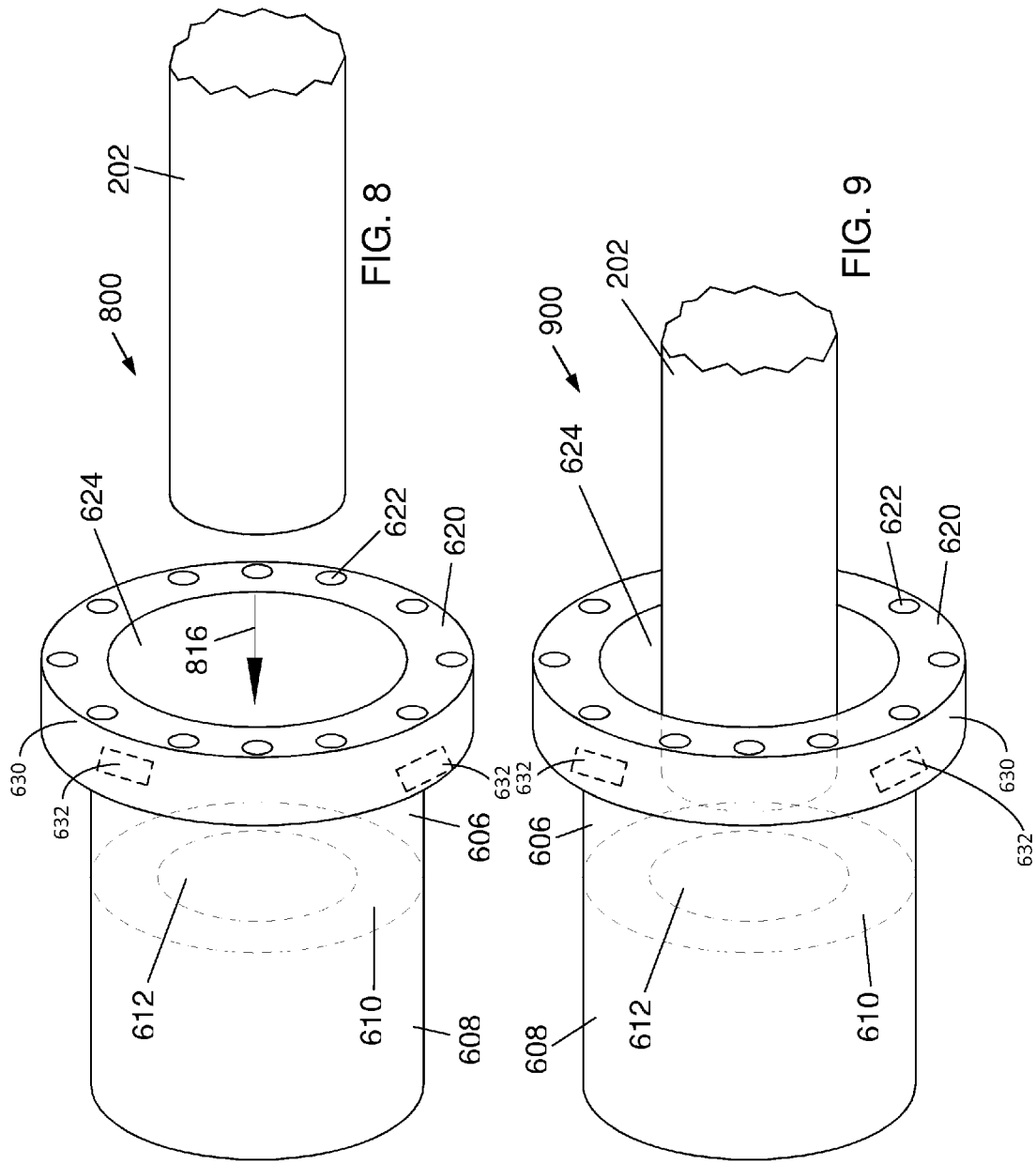

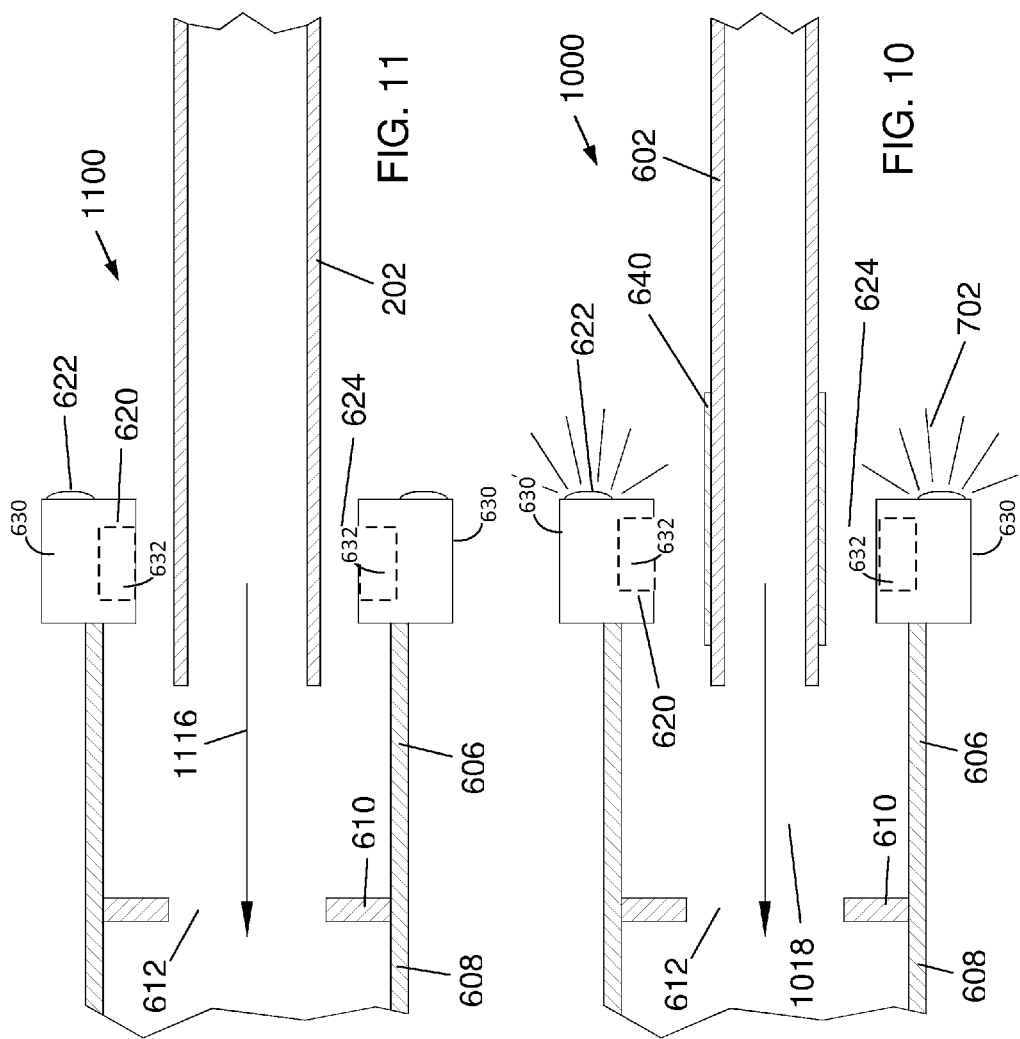

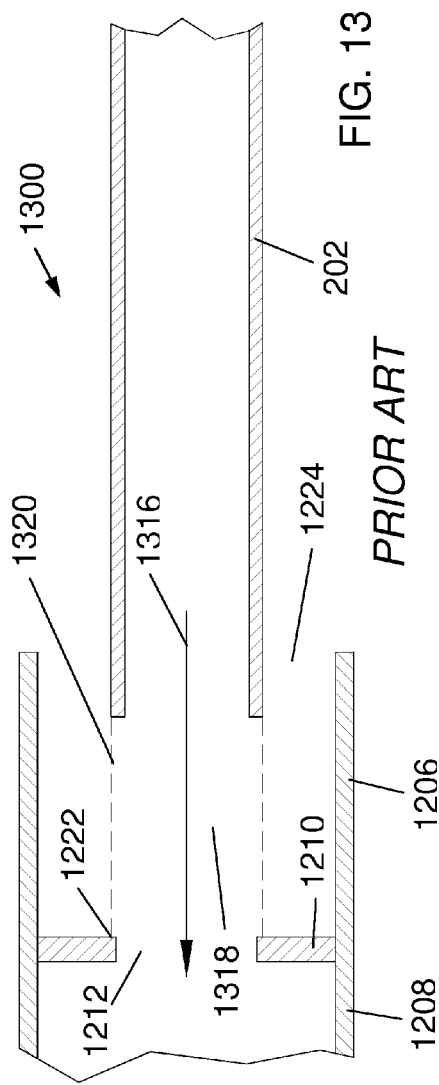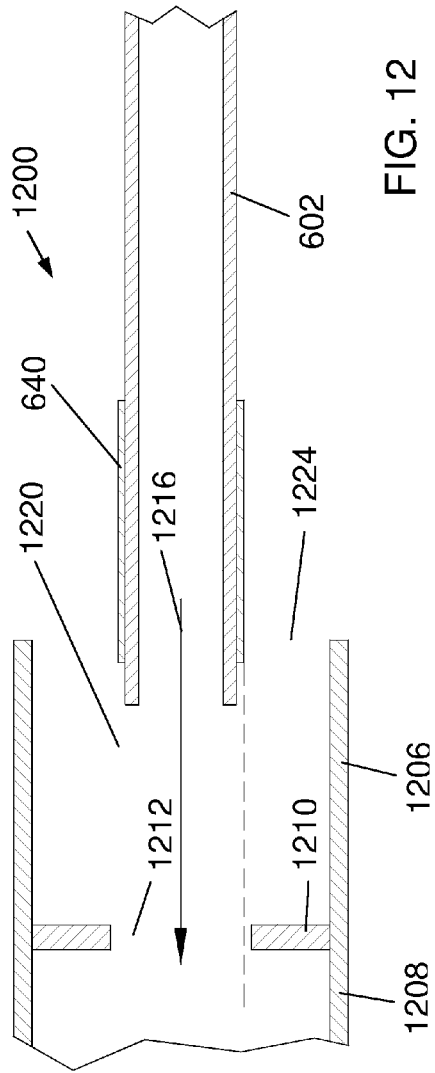

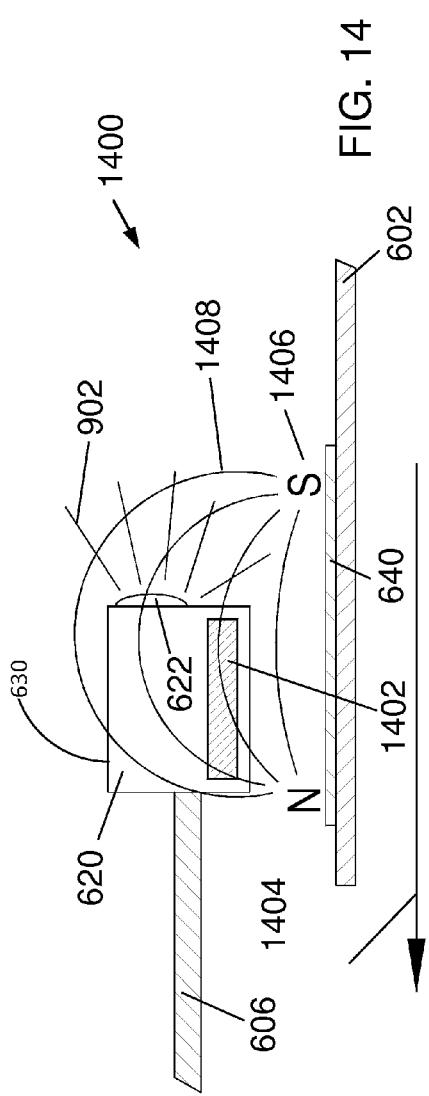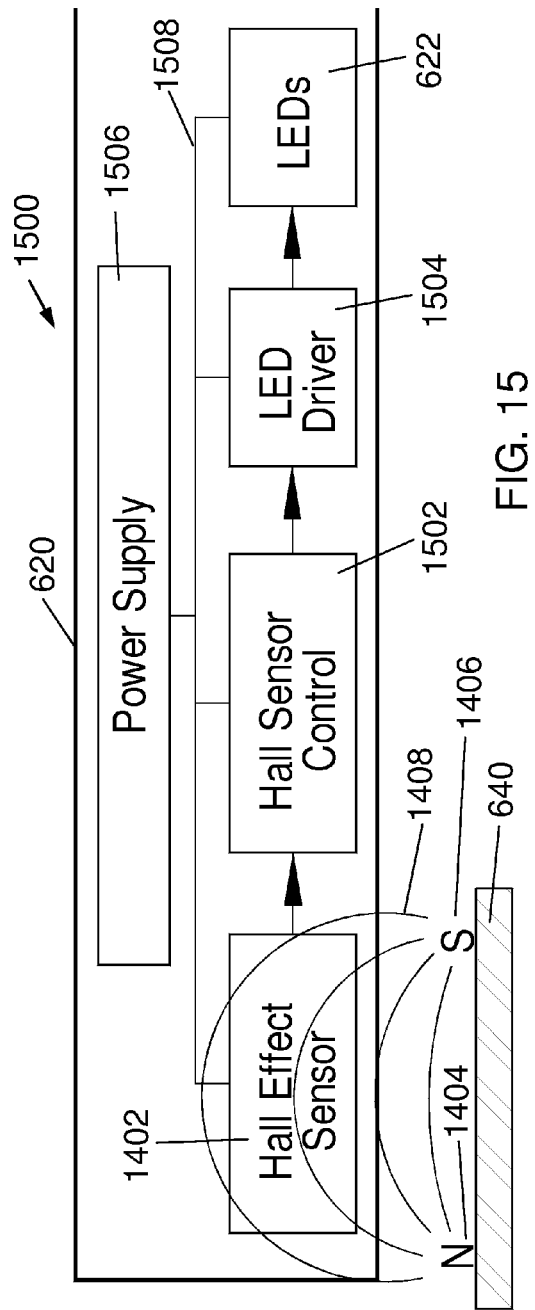

METHOD AND STRUCTURE FOR PREVENTION OF INCORRECT FUELING OPERATIONS FOR DIESEL-POWERED VEHICLES

TECHNICAL FIELD OF THE INVENTION

The present invention relates to vehicles powered by internal combustion engines and in particular to a method and structure for preventing incorrect fueling operations for diesel-powered vehicles.

BACKGROUND OF THE INVENTION

In the past few decades, government limits on the use of leaded fuels have led to the use of smaller gasoline fuel nozzles, designed to fit through "restrictors" in the fill tubes of gasoline-powered vehicles. These restrictors were designed to prevent the introduction of leaded gas into vehicles containing catalytic converters, which would be "poisoned" by the tetraethyl lead contained in older gasoline formulations. Another recent trend has been increasing use of diesel engines to power automobiles and other smaller vehicles, using low-sulfur diesel fuels. As a result, vehicles which an operator might have assumed to require gasoline in the past may now require diesel fuel instead, with correspondingly increased chances of incorrect fueling occurring.

Non-leaded gasoline fill nozzles are approximately 13/16 inch in outer diameter, with gasoline-powered vehicles being configured with restrictors in their gasoline fill tubes having openings corresponding to this size nozzle. Small vehicle diesel fill nozzles are slightly larger, approximately 15/16 inch in diameter, corresponding to the size of the older leaded gas fill nozzles. The restrictors in diesel-powered vehicles must then have openings correspondingly larger to accommodate this slightly larger size fill nozzle.

As a result, the restrictors in gasoline-powered vehicles have openings too small to allow insertion of low-sulfur #2 diesel fuel nozzles (since these nozzles have the same size as the old leaded fuel nozzles, the insertion of which the restrictor was designed to prevent). This situation generally minimizes the chance of accidentally introducing diesel fuel into a gasoline-powered vehicle. Unfortunately, the opposite error of accidentally introducing gasoline into a diesel-powered vehicle is not prevented by the restrictor mechanism, since the smaller gasoline fill nozzle easily fits through the larger opening in the diesel fill tube restrictor. In the past, when diesel power was generally employed only for larger trucks and very few smaller vehicles, this fueling error was less common. With the advent of modern diesel-powered smaller vehicles, such as those employing common-rail direct fuel injection, increasing numbers of smaller vehicles are diesel-powered with the result that fueling errors are now more common.

In response to the need to reduce fueling errors, a number of mechanical methods have been proposed. An early example is illustrated in U.S. Pat. No. 3,911,977, issued Oct. 14, 1975, describing a filler pipe end structure. More recent examples include U.S. Pat. No. 5,249,612, issued Oct. 5, 1993 for an apparatus and method for controlling fluid dispensing employing complex electronic sensing means. Purely mechanical approaches are described in U.S. Pat. No. 6,302,169, issued Oct. 16, 2001, covering a purely mechanical diesel fuel nozzle restrictor. Another purely mechanical device for preventing entry of gasoline into a diesel-powered vehicle is described in U.S. Pat. No. 6,923,226, issued Aug. 2, 2005.

A difficulty with any purely mechanical approach to preventing fueling errors is the harshness of the vehicle refueling environment. In the vast majority of cases vehicle fueling is performed by the vehicle driver who may tend to insert and remove the fill nozzle with insufficient attention to possible damage which may result to the complex mechanisms described in the above prior art fueling schemes. Thus there is a need for a method of preventing the introduction of gasoline into diesel-powered vehicles which is more robust against mechanical damage, preferably a method not requiring physical contact between the fuel nozzle (diesel or gasoline) and the sensor mechanism employed to prevent fueling errors.

SUMMARY OF THE INVENTION

An object of the invention is to provide a structure and method for preventing the accidental introduction of gasoline into a fuel tank of a diesel-powered vehicle.

A preferred embodiment uses a sensor positioned near the filler opening of a vehicle fuel tank, the sensor sensing a changing magnetic field to determine whether an incorrect fueling is about that take place and providing an alarm to warn the person fueling the vehicle. In one embodiment, a magnet on a gasoline nozzle is detected by a sensor mounted within a sensor ring attached to the entrance of the fill tube of a diesel-powered vehicle. When a gasoline nozzle is inadvertently inserted into the fill tube of the diesel-powered vehicle, the sensor ring detects a change in a magnetic field induced by the nozzle and alerts the operator that an incorrect fueling operation is being attempted.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 2 is a schematic isometric view of a diesel nozzle entering a diesel fill tube in the prior art;

FIG. 3 is a schematic isometric view of the diesel nozzle of FIG. 2 fitting closely into a diesel fill tube in the prior art;

FIG. 4 is schematic isometric view of a gasoline nozzle entering a diesel fill tube in the prior art;

FIG. 5 is a schematic isometric view of the gasoline nozzle of FIG. 4 fitting loosely in a diesel fill tube in the prior art;

FIG. 6 is a schematic isometric view of a preferred embodiment of the invention illustrating a gasoline nozzle having magnetic strips entering a diesel fill tube having a sensor ring;

FIG. 7 is a schematic isometric view of the gasoline nozzle of FIG. 6 inside the diesel fill tube of FIG. 6;

FIG. 8 is a schematic isometric view of a diesel nozzle entering a diesel fill tube having a sensor ring of a preferred embodiment of the invention;

FIG. 9 is a schematic isometric view of the diesel nozzle of FIG. 8 inside the diesel fill tube of FIG. 8;

FIG. 10 is a schematic side cross-sectional view of a preferred embodiment of the invention illustrating a gasoline nozzle having magnetic strips entering a diesel fill tube having a sensor ring;

FIG. 11 is a schematic side cross-sectional view of a diesel nozzle entering the diesel fill tube of FIG. 10;

FIG. 12 is a schematic side cross-sectional view of a gasoline nozzle having magnetic strips of a preferred embodiment of the invention entering a gasoline fill tube;

FIG. 13 is a schematic side cross-sectional view of a diesel nozzle entering a gasoline fill tube in the prior art;

FIG. 14 is a schematic side view of a preferred embodiment of the invention illustrating the magnetic field from magnetic strips attached to a gasoline nozzle which is entering a sensor ring;

FIG. 15 is a circuit block diagram for a first preferred embodiment of the invention;

DETAILED DESCRIPTION OF PREFERRED EMBODIMENTS

Figure 1:
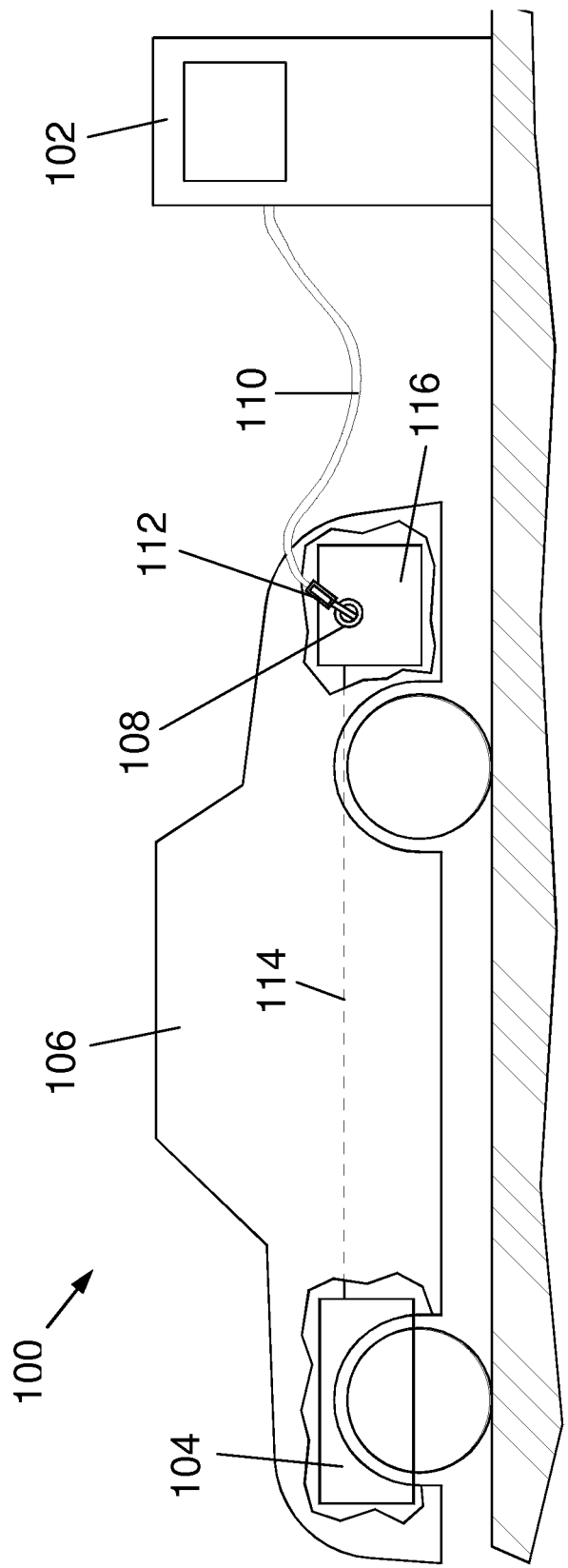
FIG. 1 is a schematic view of a motor vehicle having an internal combustion engine and a fuel tank connected to the internal combustion engine.

Embodiments of the invention can provide one or more advantages over typical prior art fueling systems. Not all embodiments will provide all the benefits. Some embodiments of the invention provide a sensor ring for a diesel fill tube. Some embodiments of the invention provide magnetic strips for a gasoline fill nozzle. Some embodiments provide a method for sensing an attempted incorrect fueling operation, such as an attempt to introduce gasoline into a fuel tank of a diesel-powered vehicle. Various types of magnetic sensors are comprised in the preferred embodiments of the present invention, including, but not restricted to, Hall Effect sensors and magnetic coils. A preferred embodiment provides a sensor ring that can be readily added to an existing vehicle and that requires minimal or no alternation to the fueling facilities. For example, in some embodiments, it is only required to add magnetic to the fueling nozzle of the gasoline pump. In some embodiments, the effect on the magnetic field cause by the difference in diameter between the diesel nozzle and the gasoline nozzle allows the sensor to determine which nozzle has been inserted.

One preferred embodiment employs magnets on the gasoline nozzle, such as attached magnetic strips of built-in magnets, and a Hall Effect sensor mounted within a sensor ring attached to the entrance of the fill tube of a diesel-powered vehicle. When a gasoline nozzle is inadvertently inserted into the fill tube of the diesel-powered vehicle, the sensor ring detects the magnetic field induced by these magnetic strips and alerts the operator (visually and/or audibly) that an incorrect fueling operation (i.e., the introduction of gasoline into a diesel-powered vehicle) is being attempted. Various types of magnetic sensors are comprised in the preferred embodiments of the present invention, including, but not restricted to, Hail Effect sensors and magnetic coils.

Another embodiment uses a transformer principle in which a primary coil is excited with an ac waveform and the resulting magnetic field is coupled to a secondary coil. The degree of magnetic coupling between the two coils depends on whether a fuel nozzle is inserted into the fill tube, and also whether the diameter of the fill nozzle corresponds to that of a gasoline or a diesel fueling system. This second preferred embodiment may detect the insertion of a gasoline nozzle into a diesel fill tube even in the absence of a magnet attached to the outside of the nozzle. The fill nozzle acts essentially as the iron of a transformer formed by the primary and secondary coils. There are then four possible conditions (illustrated in FIGS. 16-19 and the graph in FIG. 20): 1) no nozzle (i.e., the condition when not adding fuel), 2) a gasoline nozzle, 3) a diesel nozzle, or 4) a gasoline nozzle with the magnetic strips of the invention. A four-level comparator determines which of these four nozzle insertion conditions is in effect and hence whether an incorrect or a correct fueling operation is being attempted. In all cases, the detection method does not require mechanical contact mechanisms between the fuel nozzle and the fill tube which are subject to damage and subsequent failure.

FIG. 1 is a schematic view 100 of a motor vehicle 106 having an internal combustion engine 104 and a fuel tank 116 connected to the engine 104 by a fuel line 114. A fuel pump 102 supplies fuel to nozzle 112 through tube 110. Nozzle 108 is inserted through fill tube 108 to enable filling of fuel tank 116. Internal combustion engine 104 may be a gasoline engine, in which case fuel pump 102 should be configured to supply gasoline through tube 110 to fuel tank 116 to ensure proper operation of gasoline engine 104. Alternatively, internal combustion engine 104 may be a diesel engine, in which case fuel pump 102 should be configured to supply diesel fuel through tube 110 to fuel tank 116 to ensure proper operation of diesel engine 104. One possible incorrect fueling operation occurs if internal combustion engine 104 is a diesel engine and fuel pump 102 is configured to supply gasoline through tube 110 to nozzle 112. Another possible incorrect fueling operation occurs if internal combustion engine 104 is a gasoline engine and fuel pump 102 is configured to supply diesel fuel through tube 110 to nozzle 112. In either of these two incorrect fueling operations, internal combustion engine 104 will be supplied by the wrong type of fuel through fuel line 114 leading from fuel tank 116, which in both scenarios would contain the wrong type of fuel (i.e., gasoline for the diesel engine, or diesel fuel for the gasoline engine). As described above, diesel fill nozzles are generally configured to be too large in diameter to allow the filling of gasoline fuel tanks with diesel fuel, since the nozzle will not fit through the restrictor hole (see FIG. 12). Conversely, gasoline fill nozzles are small enough in diameter to easily fit into the fill tubes of diesel-powered vehicles. Thus it is an object of the present invention to configure the diesel fill tube and gasoline fill nozzle to send a warning signal to the person fueling the vehicle that an incorrect fueling operation is being attempted, before any gasoline has been introduced into the diesel fuel tank 116.

FIG. 2 is a schematic isometric view 200 of a diesel nozzle 202 entering (directional arrow 216) a diesel fill tube 204 in the prior art. Fill tube 204 comprises an outer tube 206 and an inner tube 208, where outer tube 206 and inner tube 208 are separated by a restrictor 210 with entrance hole 212 configured to fit closely around the outer diameter of diesel nozzle 202.

FIG. 3 is a schematic isometric view 300 of the diesel nozzle 202 of FIG. 2 fitting closely into entrance hole 212 in restrictor 210. A portion 302 of fill tube 202 is shown protruding through entrance hole 212 and into the inner tube 208. In this configuration, diesel nozzle 202 is positioned to supply diesel fuel to the diesel fuel tank (not shown) attached to inner tube 208. FIG. 3 illustrates a correct fueling configuration in which the proper type of fuel (i.e., diesel fuel) may be introduced to a diesel-powered vehicle.

FIG. 4 is a schematic isometric view 400 of a gasoline nozzle 402 entering (directional arrow 416) the diesel fill tube 204 of FIGS. 2 and 3 in the prior art. Note the smaller outer diameter of the gasoline nozzle 402 compared with diesel nozzle 202 in FIGS. 2 and 3. Typical gasoline nozzles have outer diameters of approximately $13/16$ inch (approximately 21 mm), while typical #2 low-sulfur diesel nozzles have outer diameters of approximately $15/16$ inch (approximately 24 mm).

FIG. 5 is a schematic isometric view 500 of the gasoline nozzle 402 of FIG. 4 fitting loosely into the diesel fill tube 204 of FIGS. 2 and 3 in the prior art. A portion 502 of fill tube 402 is shown protruding through entrance hole 212 and into the inner tube 208. In this configuration, gasoline nozzle 402 is positioned to supply gasoline to the diesel fuel tank (not shown) attached to inner tube 208. FIG. 5 illustrates an incorrect fueling configuration in which the wrong type of fuel (i.e., gasoline) may be introduced to a diesel-powered vehicle. Note that in the prior art there is no physical bar to the insertion of a gasoline nozzle into the diesel fuel tube, thus the incorrect fueling operation illustrated in FIGS. 4 and 5 is possible, and indeed, commonly occurs accidentally. As discussed above, the consequences of supplying gasoline to a diesel internal combustion engine may include serious damage to internal components of the diesel engine arising from premature explosion of the gasoline within the engine cylinders (due to the higher compression ratios compared with gasoline engines), as well as a lack of natural lubrication for engine components (diesel fuel oil is a lubricant, while gasoline is not). Thus it is an object of the present invention to alert individuals who are attempting to refuel a diesel-powered vehicle using a gasoline that an incorrect fueling operation is being attempted, before gasoline has been introduced to the diesel fuel tank of the vehicle, thus necessitating costly repairs even in the case where the diesel engine is not actually operating on gasoline (i.e., the gasoline only contaminates the fuel system leading up to the engine).

FIG. 6 is a schematic isometric view 600 of a gasoline nozzle 602 having magnetic strips 640 of a preferred embodiment of the invention entering a diesel fill tube 624 having a sensor ring 620 of a preferred embodiment of the invention. Magnetic strips 640 strips may be attached by any means, for example, with an adhesive which is formulated to withstand the gasoline and diesel fuel environment. Magnetic strips 640 strips may also be attached by welding or brazing or by mechanical fasteners that are sufficiently small that they do not interfere with insertion of the nozzle or the flow of fuel. In some embodiments, magnets can be integrated into the nozzle 602, for example, by magnetizing portions of the nozzle, magnetizing the entire nozzle, inserting magnets into a hole in the nozzle or inlaying magnets into depressions in the nozzle. Magnetic strips 640 or other magnets preferably create a sufficient strong field to be detected regardless of the orientation of the fuel nozzle. Multiple magnets may be positioned around the diameter of the fuel nozzle 602, the sensor ring 620 may include multiple sensors to sense a single magnet, or multiple sensors can sense multiple magnets.

Sensor ring 620 includes means to detect when a gasoline nozzle is being passed through the sensor ring to be inserted into the fuel filler tube of a diesel-powered vehicle. Sensor ring 620 also preferably includes a method of alerting the operator that an incorrect fueling operation is being attempted. One embodiment of sensor ring 620 includes a ring-shaped base 630 containing one or more magnetic field sensors 632, such as a Hall effect sensor or conductive coils to sense a changing magnetic field, and an attachment means (not shown), such as a mechanical clamp of adhesive, for attaching the base 630 to the filler tube 608. In one embodiment, sensor ring 620 includes visual alarms, such as one or more LEDs or lights 622 (not illuminated in FIG. 6), attached to the base 630 positioned to be within clear view of the operator during an attempted fueling operation. In other embodiments, sensor ring 620 may comprise an audible alarm, such as a horn or audio speaker. In yet other embodiments, sensor ring 620 may comprise a combination of visual and audio alarms to alert the operator that an incorrect fueling operation is being attempted. In yet another embodiment, sensor ring 620 may be connected to the vehicle electrical system and the audio or visual alarm may use the vehicle horn and/or lights. Because the sensor ring 620 and any alarm system are used in the presence of highly flammable gasoline fumes, the sensor, alarm and supporting circuitry are designed in accordance with the well known principle of design for use in such environments.

Sensor ring 620 is shown mounted at the entrance of diesel fill tube 624. Fill tube 624 comprises an outer tube 606 and an inner tube 608, where outer tube 606 and inner tube 608 are separated by a restrictor 610 having an entrance hole 612 configured to fit closely around the outer diameter of diesel nozzle 202. Insertion of gasoline nozzle 602 into diesel fill tube 624 (directional arrow 616) constitutes an attempted incorrect fueling operation. At the point in time shown in FIG. 6, the operator is not yet being alerted to this error, since the gasoline nozzle 602 is not yet in position to introduce the wrong fuel (i.e., gasoline) into the diesel fuel tank (not shown) connected to inner tube 608.

FIG. 7 is a schematic isometric view 700 of the gasoline nozzle 602 of FIG. 6 inside diesel fill tube 624. The magnetic field generated by magnetic strips 640 extends outwards, penetrating sensor ring 620. Sensor ring 620 (see FIGS. 14 and 15) is configured to detect the magnetic field from strips 640, thereby triggering sensor ring 620 to alert the operator by either visual, audible, or a combination of visual and audible, alarms that an incorrect fueling operation is being attempted. For example, in FIG. 7, LEDs 622 are shown illuminated 702 to alert the operator visually before gasoline has been introduced to the diesel fuel tank (not shown) connected to inner tube 608.

FIG. 8 is a schematic isometric view 800 of diesel nozzle 202 of FIG. 2 entering (directional arrow 816) diesel fill tube 624 of FIG. 6 having a sensor ring 620 of a preferred embodiment of the invention. Since diesel nozzle 202 is not configured with magnetic strips, such as strips 640 on the gasoline nozzle 602 in FIGS. 6 and 7, sensor ring 620 does not sense a magnetic field and thus is not activated to emit visual or audible alarms. Insertion of diesel nozzle 202 into diesel fill tube 624 constitutes a correct fueling operation, thus there is no need to alert the operator.

FIG. 9 is a schematic isometric view 900 of the diesel nozzle 202 of FIGS. 2 and 8 inside the diesel fill tube 624 of FIG. 8. Comparison with FIG. 7 illustrates the operation of the sensor ring in alerting the operator: in FIG. 7 an incorrect fueling operation is being attempted, thus the operator is alerted (visually, audibly, or visually and audibly), while in FIG. 9 a correct fueling operating is being attempted and there is no need to alert the operator.

FIG. 10 is a schematic side cross-sectional view 1000 of the gasoline nozzle 602 of FIG. 6 entering (directional arrow 1016) diesel fill tube 624 having a sensor ring 620 of a preferred embodiment of the invention. Note that physically, there is no obstruction to inserting gasoline nozzle 602 through entrance hole 612 in restrictor 610, thus in the absence of an alarm from sensor ring 620, it is likely that the operator would continue to push gasoline nozzle 602 towards the left of FIG. 10, through entrance hole 612, and proceed to introduce gasoline into the diesel fuel tank (not shown) which is connected to inner tube 608, thereby incorrectly fueling the diesel-powered vehicle. The visual alarm 702 emitted from LEDs 622 is intended to alert the operator before incorrect fueling has commenced, so that insertion of nozzle 602 will stop as illustrated by the "X" mark 1018. Note that the hole in restrictor 610 is designed to fit closely to diesel tube 202 (see FIG. 11), thus the outer dimensions of magnetic strips 640 must fit through entrance hole 612. This criterion places an upper limit on the radial thickness of magnetic strips 640, typically less than ⅛ inch.

FIG. 11 is a schematic side cross-sectional view 1100 of the diesel nozzle 202 of FIG. 2 entering (directional arrow 1116) the diesel fill tube 624 of FIG. 10. Since the entrance hole 612 of restrictor 610 has been configured to allow passage of diesel nozzle 202, the operator may insert nozzle 202 and then commence a correct fueling operation consisting of introducing diesel fuel into the diesel fuel tank connected to inner tube 608.

FIG. 12 is a schematic side cross-sectional view 1200 of the gasoline nozzle 602 of FIG. 6 entering (directional arrow 1216) a gasoline fill tube 1224. Dashed lines 1220 extend the outer dimension of magnetic strips 640 through entrance hole 1212 in restrictor 1210, separating outer tube 1206 from inner tube 1208. Inner tube 1208 is connected to a fuel tank of a gasoline-powered vehicle such as vehicle 106 in FIG. 1. FIG. 12 illustrates a correct fueling operation, as well as the requirement that the magnetic strips 640 must be relatively thin radially to enable a gas nozzle 602 of a preferred embodiment of the invention to fit through entrance hole 1212. Because entrance hole 1212 was configured for a relatively close fit to prior art gas nozzles (such as nozzle 402 in FIGS. 4 and 5), the addition of magnetic strips 640 makes the fit closer.

FIG. 13 is a schematic side cross-sectional view 1300 of the diesel nozzle 202 of FIG. 2 entering (directional arrow 1316) a gasoline fill tube 1224 in the prior art. Dashed lines 1320 extend the outer diameter of fill tube 202 up to restrictor 1210 at point 1222, showing that it is impossible to insert fill tube 202 past restrictor 1210 since entrance hole 1212 is too small. Thus an incorrect fueling operation comprising the introduction of diesel fuel into a gasoline-powered vehicle is prevented physically as illustrated by the "X" mark 1318.

FIG. 14 is a schematic side view 1400 of the magnetic field 1408 from a gasoline nozzle 602 having magnetic strips 640 of a preferred embodiment of the invention. Nozzle 602 is entering (directional arrow 1116) a sensor ring 620 of a first preferred embodiment of the invention. For clarity, North 1404 and South 1406 poles of magnetic strip 640 are shown. The polarity and orientation of the magnetic field generated by magnetic strips 640 should be configured consistent with the detection direction of magnetic sensor 1402 within sensor ring 620 to ensure adequate levels of sensitivity for detection of the magnetic strips 640. While the poles are shown in a longitudinal orientation, the poles could also be arranged radially. FIG. 14 corresponds to FIG. 10, illustrating the penetration of the magnetic field lines 1408 into sensor ring 620, thereby inducing the circuit within sensor ring (see FIG. 15) to alert the operator (by illuminating 902 LEDS 622) that nozzle 602 is configured to introduce the wrong type of fuel (i.e., gasoline) into the diesel-powered vehicle.

FIG. 15 is an exemplary circuit block diagram 1500 for a first preferred embodiment of the invention. The magnetic field lines 1408 from FIG. 14 penetrate through the outer enclosure of sensor ring 620 as shown and are then detected by a magnetic sensor. In one preferred embodiment, the magnetic sensor may be a Hall Effect sensor 1402, as shown in FIG. 15. In alternative embodiments, the magnetic sensor may be a magnetic coil. Hall Effect sensor 1402 is controlled by Hall Sensor Control 1502. The output signal from Hall Sensor Control 1502 is fed to light-emitting diode (LED) Driver 1504, which controls LEDs 622 on the exterior of sensor ring 620. A power supply 1506 supplies power through bus line 1508 to Hall Effect Sensor 1402, Hall Sensor Control 1502, LED Driver 1504, and LEDs 622. Power supply 1506 may comprise batteries internal to sensor ring 620, or may receive power from the vehicle comprising sensor ring 620.

FIGS. 6-11 illustrate operational modes of preferred embodiments of the invention, including the first embodiment shown in FIGS. 14 and 15 comprising a Hall Effect sensor, as well as a second embodiment shown in FIGS. 16-20, 21, and 22 comprising magnetic coil sensors.

Figure 16:
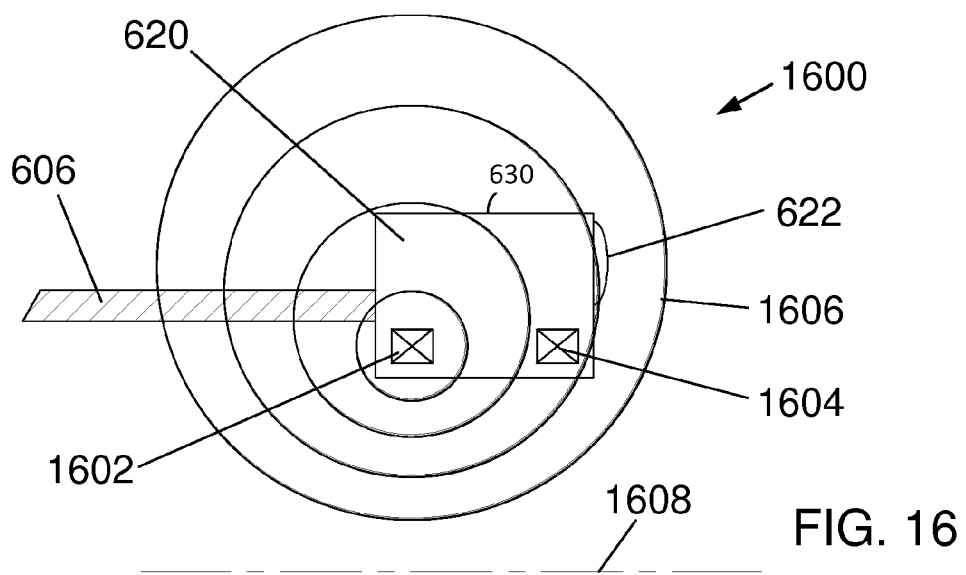
FIG. 16 is a schematic diagram of a sensor ring of a second preferred embodiment of the invention.

FIG. 16 is a schematic diagram 1600 of a sensor ring 620 of a second preferred embodiment of the invention mounted on the fill tube of a diesel fuel tank in the case where no fuel nozzle is present. A primary coil 1602 is excited with an ac voltage by a primary coil driver 2102 (see FIG. 21), generating a magnetic field 1606. Primary coil 1602 is configured such that magnetic field extends into the internal volume of outer tube 606 as shown, in order to penetrate any fill nozzles which may be inserted into the fill tube having sensor ring 620 attached. The axis 1608 of sensor ring 620 illustrates that the magnetic field may extend throughout a substantial portion of the volume enclosed by the inner diameter of sensor ring 620. A small portion of magnetic field 1606 is configured to pass through secondary coil 1604. Primary coil 1602 and secondary coil 1604 together comprise the magnetic field sensor, analogous to the Hall Effect sensor of the first preferred embodiment. In the absence of any magnetic objects within the fill nozzle, the magnetic coupling between primary coil 1602 and secondary coil 1604 is weak, equivalent to an air-core transformer.

Figure 17:
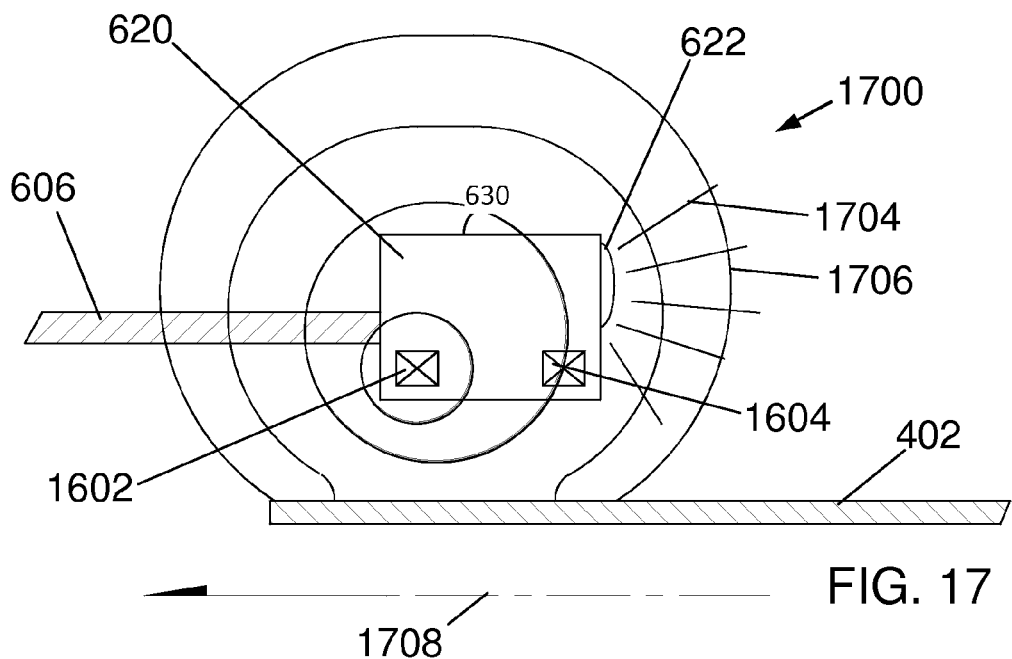
FIG. 17 is a schematic diagram of the sensor ring of a second preferred embodiment of the invention detecting a gasoline fill nozzle.

FIG. 17 is a schematic diagram 1700 of the sensor ring 602 of FIG. 16 with a prior art gasoline nozzle 402 (see FIG. 4) inserted (directional arrow 1708) through sensor ring 620. Note that this constitutes an attempted incorrect fueling operation, since gasoline nozzle 402 would introduce the wrong fuel into the diesel fuel tank connected to outer tube 606 (through inner tube 608, not shown here). Since in general gasoline fuel nozzles comprise magnetic materials (typically steel), the insertion of gas nozzle 402 increases the coupling of magnetic flux 1706 from primary coil 1602 to secondary coil 1604 as shown by the displacement of flux 1706 relative to flux 1606 in FIG. 16. This is equivalent to a more efficient transformer than was the case in FIG. 16. The circuit in FIG. 21 has activated the alarm (illumination 1704 of LEDs 622) to alert the operator that an incorrect fueling operation is being attempted (see also FIG. 20).

Figure 18:
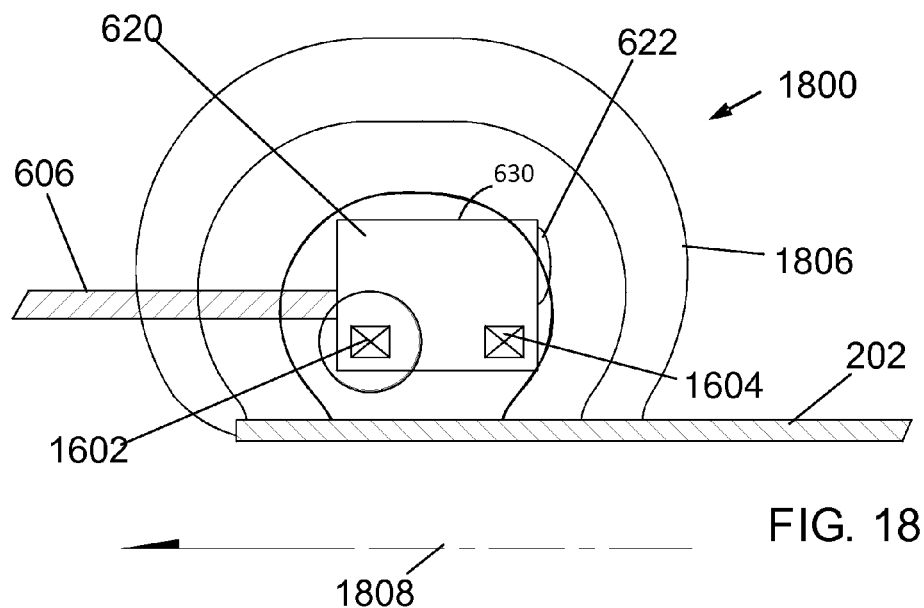
FIG. 18 is a schematic diagram of the sensor ring of a second preferred embodiment of the invention detecting a diesel fill nozzle.

FIG. 18 is a schematic diagram 1800 of the sensor ring 620 of FIGS. 16 and 17 with a diesel nozzle 202 (see FIG. 2) inserted (directional arrow 1808) through sensor ring 620. Note that this constitutes a correct fueling operation, since diesel nozzle 202 would introduce the correct fuel into the diesel fuel tank connected to outer tube 606 (through inner tube 608, not shown here). Since in general diesel fuel nozzles comprise magnetic materials (typically steel), the insertion of diesel nozzle 202 increases the coupling of magnetic flux 1806 from primary coil 1602 to secondary coil 1604 as shown by the displacement of flux 1806 relative to flux 1606 in FIG. 16. Because diesel nozzle 202 has a larger outer diameter (compare FIG. 18 to FIG. 17) than gasoline nozzle 402 in FIG. 17, the magnetic coupling in FIG. 18 is stronger than in FIG. 17, as illustrated by the displacement of flux 1806 relative to flux 1706 in FIG. 17. This is equivalent to a more efficient transformer than was the case in FIG. 16 or 17. The circuit in FIG. 21 has sensed that the level of magnetic coupling is greater than would be the case for a gasoline nozzle (as in FIG. 17), thus LEDs 622 are not activated (see also FIG. 20)

Figure 19:
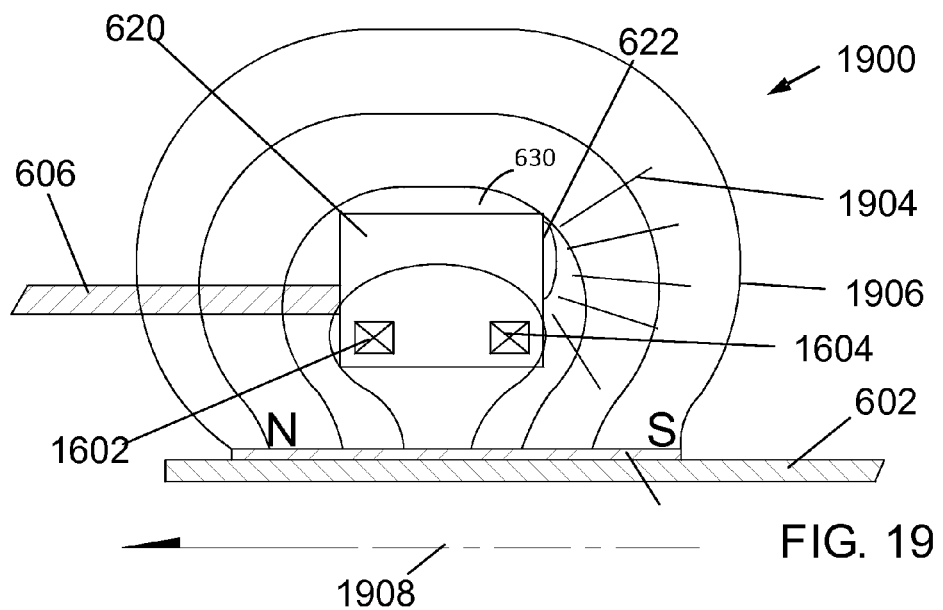
FIG. 19 is a schematic diagram of a preferred embodiment of the invention illustrating a sensor ring detecting a gas fill nozzle with magnetic strips.

FIG. 19 is a schematic diagram 1900 of the sensor ring 620 of FIGS. 16-18 detecting a gas fill nozzle 602 with magnetic strips 640 of a preferred embodiment of the invention inserted (directional arrow 1908) through sensor ring 620. For this example, the magnetic coupling between primary coil 1602 and secondary coil 1604 is closer than for any of the cases shown in FIGS. 16-18, thus flux lines 1906 are shown moved out farther than flux lines 1606, 1706, or 1806, in FIGS. 16, 17, and 18, respectively. This is equivalent to an efficient iron-core transformer. The circuit in FIG. 21 has activated the alarm (illumination 1904 of LEDs 622) to alert the operator that an incorrect fueling operation is being attempted (see also FIG. 20).

Figure 20:
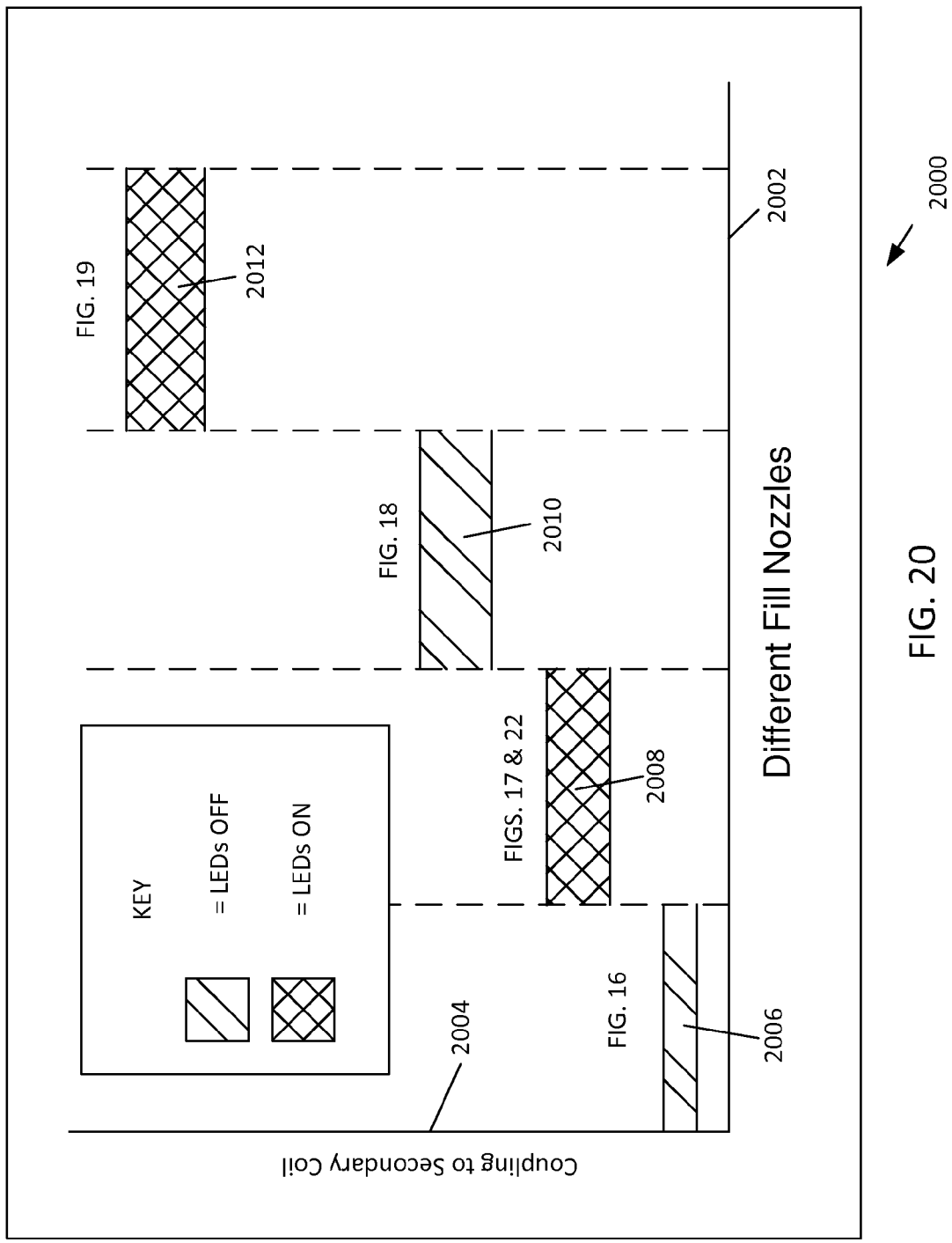
FIG. 20 is a graph of secondary coil coupling for various types of nozzles in a second preferred embodiment of the invention.

FIG. 20 is a graph 2000 of secondary coil coupling (vertical axis 2004) for the four examples (horizontal axis 2002) in FIGS. 16-19. The lowest coupling 2006 occurs for FIG. 16 where no fill nozzle is inserted into the fill tube. This is the case during normal operation of the vehicle and no alarm is required, as indicated by the diagonal shading indicating that the LEDs are off. The next highest coupling 2008 occurs when a prior art gasoline nozzle (i.e., not having magnetic strips 640) is inserted through the sensor ring 620. This indicates an attempted incorrect fueling operation and therefore LEDs 622 are activated as indicated by the cross-hatched shading. For FIG. 18, since the diesel nozzle contains more magnetic material (larger diameter), the coupling 2010 is increased relative to FIGS. 16 and 17 as shown. Since FIG. 18 represents a correct fueling operation (i.e., diesel fuel into a diesel-powered vehicle), LEDs 622 are off as indicated by the diagonal shading. Finally, if a gasoline fill nozzle comprising magnetic strips 640 of a preferred embodiment of the invention is inserted through sensor ring 620, the magnetic coupling 2012 is efficient, and the attempted fueling operation is incorrect, thus LEDs 622 are on. Note the alternating activation requirements for the LEDs: off, on, off, then on, as the coupling increases along axis 2004.

Figure 21:
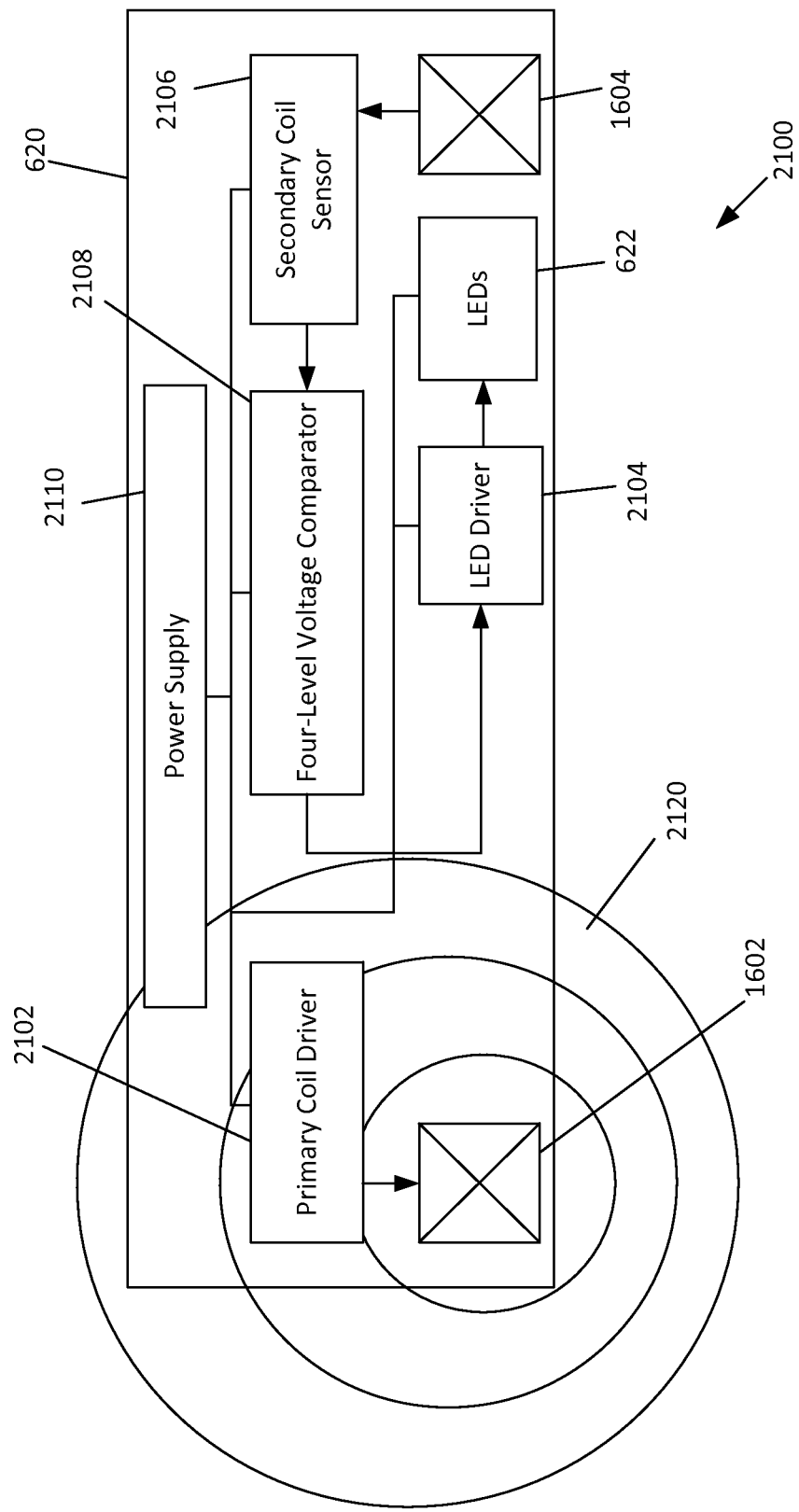
FIG. 21 is a circuit block diagram for a second preferred embodiment of the invention.

FIG. 21 is a circuit block diagram 2100 for a second preferred embodiment of the invention, implementing the LED activation requirements illustrated in FIG. 20. This circuit is shown for exemplary purposes and other circuits may be employed to sense the level of magnetic coupling between the primary and secondary coils as is familiar to those skilled in the art. Primary coil driver 2102 excites primary coil 1602 with an ac current to generate a magnetic field 2120. Magnetic field 2120 may correspond to any of magnetic fields 1606, 1706, 1806, or 1906, in FIGS. 16-19, respectively, depending on which nozzle is inserted through the inner diameter of sensor ring 620. The excitation frequency of coil 1602 may be chosen to optimize the degree of magnetic coupling for the various cases shown in FIG. 20. Typical frequencies may be 60 to 1000 Hz. Secondary coil sensor 2106 detects an ac current from secondary coil 1604 induced by the magnetic coupling between coils 1602 and 1604. This current may be rectified and filtered to a dc voltage which is fed to a four-level voltage comparator 2108. The voltage comparator 2108 performs the function illustrated in FIG. 20 to determine whether an incorrect fueling operation is being attempted. If either of the cases in FIG. 17 or 19 is occurring (i.e., attempted incorrect fueling operations), then the four-level voltage comparator 2108 activates LED driver 2104 to turn on LEDs 622. In alternative preferred embodiments, the four-level voltage comparator 2108 might activate an audible alarm. A power supply 2110 supplies power to primary coil driver 2102, four-level voltage comparator 2108, secondary coil sensor 2106, LED driver 2104, and LEDs 622. Power supply 2110 may comprise batteries internal to sensor ring 620, or may receive power from the vehicle comprising sensor ring 620.

Figure 22:
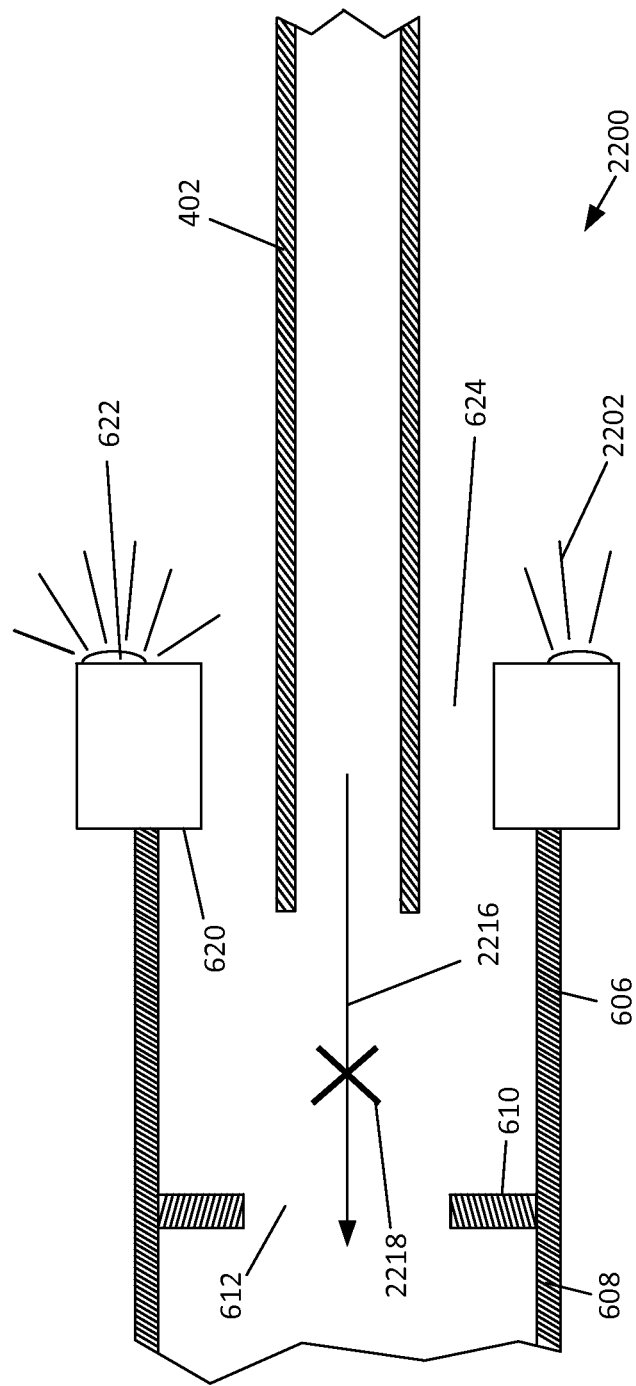
FIG. 22 is a schematic diagram of the sensor ring of a second preferred embodiment of the invention detecting a prior art gas fill nozzle.

FIG. 22 is a schematic diagram 2200 of the sensor ring 620 of a second preferred embodiment of the invention detecting a prior art gas fill nozzle 402 being inserted (directional arrow 2216), equivalent to the example shown in FIG. 17. LEDs 622 are illuminated 2202 to alert the operator that an incorrect fueling operation is being attempted, as indicated by the "X" mark 2218.

Embodiments of the invention include the filler tube sensor ring, which is to be positioned at the filler tube, as well as the combination of the sensor ring with the magnets on the gasoline nozzle. Embodiments of the invention also include methods of making and using the invention, including making and using the embodiments described above. For example, a method of making a filler tube sensor ring of the present invention comprises providing a base, providing a means for mounting the base at the entrance to a filler tube of a diesel powered vehicle, providing sensors on the base, and optionally providing an alarm means, to provide an audible or visible signal to the refueler. Another embodiment of the invention includes a method for detecting the insertion of a gasoline fuel nozzle into a fill tube of a fuel tank of a diesel-powered vehicle, comprising inserting a gasoline fuel nozzle having a magnet into the fill tube of a diesel-powered vehicle, the fill tube including a magnetic sensor for detecting the magnet and the fill tube providing an observable or audible alarm; and observing or hearing the alarm and removing the gasoline fuel nozzle from the fill tube of the fuel tank. Yet another embodiment of the invention comprise a method of ensuring that gasoline is not inserted into the tank of a diesel vehicle, including providing a gasoline nozzle having a magnet attached thereto so that when the magnet is inserted into a filler tube of a diesel vehicle having a magnetic field sensor, the gasoline nozzle causes a change to the magnetic field which change is detected by the magnetic field sensor to cause an alarm.

While embodiments were shown with magnets attached to gasoline nozzle, some embodiments could include magnets attached to the diesel nozzle, and the sensors would look for the corresponding signal to indicate that the diesel nozzle is present, and provide an alarm when the signal is not present.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. An apparatus for alerting a refueler to the attempted introduction of gasoline into a diesel-powered vehicle, comprising:
   at least one magnet attached to a gasoline fuel nozzle;
   a magnetic field sensor attached to the entrance of a fill tube on a diesel-powered vehicle to detect when the gasoline fuel nozzle is being inserted into the fill tube on the diesel-powered vehicle; and
   an audible or visual alarm connected to the magnetic field sensor to alert the refueler that the gasoline fuel nozzle is being inserted into the diesel powered vehicle.

2. An apparatus for alerting a refueler to the attempted introduction of gasoline into a diesel-powered vehicle, comprising:
   at least one magnet attached to a gasoline fuel nozzle; and
   a magnetic field sensor attached to the entrance of fill tube on a diesel-powered vehicle to detect when the gasoline fuel nozzle is being inserted into the fill tube on the diesel-powered vehicle;
   wherein the at least one magnet comprises a magnetic strip attached to the fuel nozzle or the at least one magnet is integrated into the fuel nozzle.

3. The apparatus of claim 1 in which the at least one magnet is integrated into the fuel nozzle.

4. The apparatus of claim 1 wherein the magnetic field sensor comprises a Hall effect sensor.

5. The apparatus of claim 1 wherein the magnetic field sensor comprises:
   a primary magnetic coil, configured to generate a magnetic field within the fill tube; and
   a secondary magnetic coil, configured to intercept a portion of the magnetic field generated by the primary magnetic coil.

6. The apparatus of claim 5 wherein the magnetic field is an alternating current magnetic field.

7. The apparatus of claim 5 wherein the degree of coupling between the primary magnetic coil and the secondary magnetic coil is an indication of an incorrect fueling operation being attempted.

8. A fill tube filler sensor ring for a diesel powered vehicle, comprising:
   a base adapted to be attached to the fill tube of a diesel-powered vehicle;
   a magnetic field sensor attached the base for sensing the passage of a magnetic material into the filler tube;
   an audible or visual alarm attached to the base for indicating to a refueler that a gasoline fuel nozzle having a magnetic material is passing the magnetic field sensor.

9. The fill tube sensor ring of claim 8 in which the magnetic field sensor comprises a Hall-effect sensor.

10. The fill tube sensor ring of claim 8 in which the magnetic field sensor, comprises:
    a primary magnetic coil, configured to generate a magnetic field within the fill tube; and
    secondary magnetic coil, configured to intercept a portion of the magnetic field generated by the primary magnetic coil.

11. The fill tube sensor ring of claim 8 in which the magnetic field sensor is configured to determine from the size of a filler nozzle inserted into the filler tube whether the filler nozzle is a gasoline filler nozzle or a diesel filler nozzle.

12. The fill tube sensor ring of claim 8 in which the magnetic field sensor is configured to detect a magnet on the filler nozzle.

13. The fill tube sensor ring of claim 8 in which the magnetic field sensor is configured to detect a magnet material that is not a magnet on the filler nozzle.

14. A method of making a filler tube sensor ring, comprising:
    providing a base;
    providing means for attaching the base to the filler tube of a diesel-powered vehicle;
    providing a magnetic field sensor attached to the base; and
    providing a warning device attached to base for warning when a gasoline nozzle is inserted into the filler tube of a diesel vehicle.

15. A method for detecting the insertion of a gasoline fuel nozzle into a fill tube of a fuel tank of a diesel-powered vehicle, comprising the steps of:
    inserting a gasoline fuel nozzle having a magnet into the fill tube of a diesel-powered vehicle, the fill tube including a magnetic sensor for detecting the magnet and the fill tube providing an observable or audible alarm;
    observing or hearing the alarm and removing the gasoline fuel nozzle from the fill tube of the fuel tank.

16. A method of ensuring that gasoline is not inserted into the tank of a diesel vehicle, comprising providing a gasoline nozzle having a magnet attached thereto so that when the magnet is inserted into a filler tube of a diesel vehicle having a magnetic field sensor, the gasoline nozzle causes a change to the magnetic field which change is detected by the magnetic field sensor to cause an alarm.

17. The apparatus of claim 2 wherein the magnetic field sensor comprises a Hall effect sensor.

* * * * *